Oct. 27, 1970 B. V. FEJMERT 3,536,304
MIXING APPARATUS
Filed Sept. 11, 1968
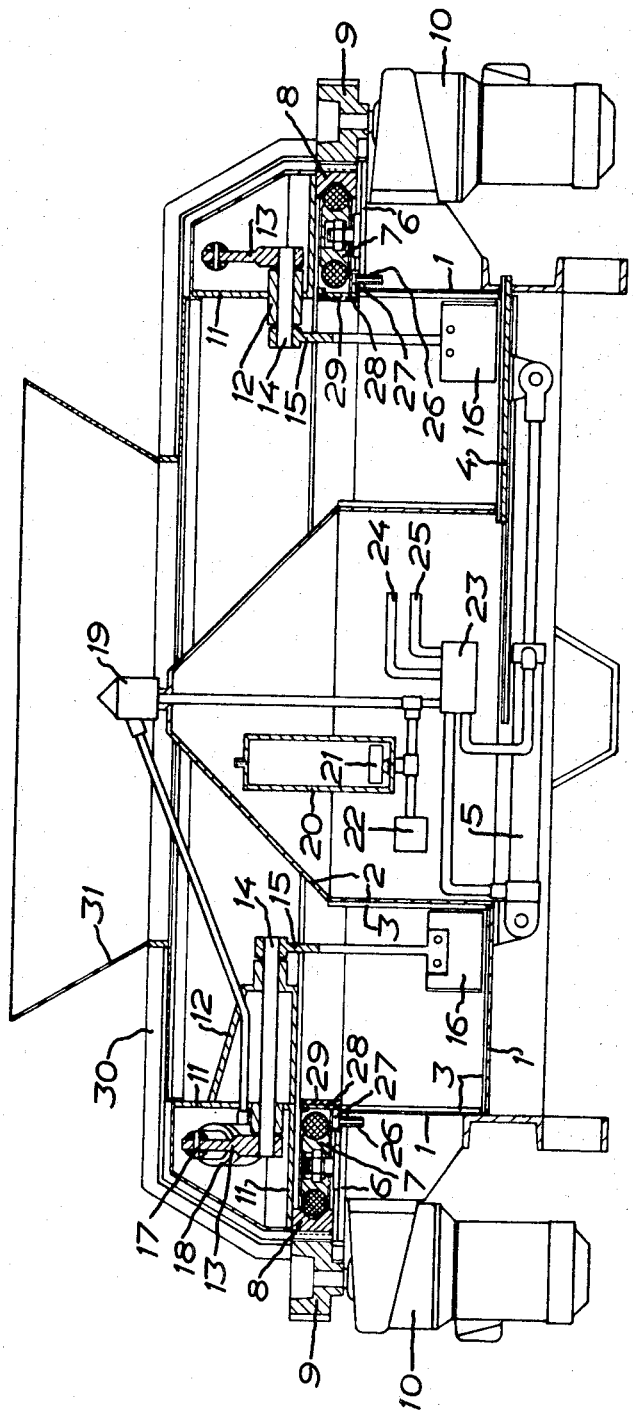
INVENTOR:
BERNHARD VALDEMAR FEJMERT
by
Browne, Schuyler & Beveridge
Attorneys 3,536,304
MIXING APPARATUS
Bernhard V. Fejmert, Vastra Tradgardsgatan 27,
Nykoping, Sweden
Filed Sept. 11, 1968, Ser. No. 758,992
Int. Cl. B28c 5/10
U.S. Cl. 259—178                                  6 Claims

ABSTRACT OF THE DISCLOSURE

An apparatus for mixing materials, preferably the ingredients of concrete, including an annular mixing vessel and a number of mixing blades projecting thereinto. The blades and the mixing vessel are relatively movable in a circular sense. The blades are pivoted to and supported by arms mounted on brackets or like means which are secured to an annular driven member disposed on the peripheral wall of the vessel and rotatable in relation thereto. The blade supporting arms can be pivoted by operating means for actuation of the mixing blades, and the free ends of the arms, which are directed towards the center of the mixing vessel, are spaced from the inner boundary wall of the vessel.

---

This invention relates to an apparatus for mixing materials, preferably the ingredients of concrete, including an annular vessel having a bottom discharge, an annnular member mounted at the periphery of the vessel and rotatable on it, and a number of mixing blades which are mounted on arms and caused to shift in a circular sense by power transmission from said annular member.

On mixing materials, for example for producing concrete, in so-called planetary type or automatic mixers where mixing of the batch is effected by means of movable blades a high velocity of the blades with regard to the material being mixed is of decisive importance for realizing a homogeneous mixture. At the production of a first class mixture, due to the required high speed of the blades the drive and suspension device of the mixing blades is greatly stressed particularly so at the production of for example concrete with coarse aggregate and of tough consistency.

Earlier constructions of planetary type or automatic mixers substantially comprise an upstanding cylindrical vessel having a discharge opening in the side wall or bottom, and mixing blades rotating in the horizontal plane. The blades are driven via suspension and spring mechanism by a power source generally equipped with a reduction gear and output shaft of which is placed in the center of the cylindrical vessel. Filling of material into this type of mixture takes place at the outer periphery of the vessel.

As a result of this construction with the high speeds of the mixing blades the load on the transmission and power source will be extremely jerky since the suspension device for the mixing blades having the highest peripheral speed and thus the highest load constitute the longest moment arms. Besides the material filled into the vessel, which mostly occurs by gravity from an overlying silo or other filling device will violently collide with that part of the suspension and spring mechanism which also has the highest speed. Furthermore from the viewpoint of service this construction of mixing apparatus has proved to possess great disadvantages since the power source and the transmission generally are very difficult to get at because they are placed in the center of the cylindrical vessel. Numerous break-downs of both transmission and power source with this type of mixer have proved in practice that the problem of concentrating the driving power to the center of the machine is difficult to solve within an acceptable range of costs, which becomes even more marked with large machines. A further very important deficiency of these earlier constructions is the pronounced separation of the finished mixture when discharged, since the coarse aggregate particles are thrown out through the opening in the side wall or bottom at almost the same speed as that of the mixing blades, thereby separating from the fine aggregate particles. With some of these previously known planetary type mixers or automatic mixers it has been tried to overcome the above mentioned deficiencies by lowering the speed of the mixing blades at the filling and emptying operations. To this end, use has been made of variable gearings, multispeed motors etc. which results in a very complicated and expensive equipment and, what is more, in a considerably longer emptying time.

This invention has for its object to provide an apparatus in which the drive as well as the means carrying the mixing blades are placed at the periphery of the mixer whereby the above mentioned serious drawbacks of the earlier types of so called planetary type mixers or automatic mixers are eliminated. The apparatus according to the invention is characterized by the fact that the annular member has associated with it brackets or like means which project towards the center of the vessel and the inner ends of which are spaced from the cylindrical or conical inner boundary wall of the annular vessel, and that said brackets support rotary shafts which at their ends close to the vessel center are rigidly connected with the arms carrying the mixing blades and localized preferably at right angles to said rotary shafts which have the outer ends connected to operating means which are associated with the rotary member and serve to pivot the mixing blade arms.

The invention will be more fully described in the following, reference being had to the accompanying drawing which shows a cross section of a mixer according to the invention.

Mixing takes place in the space between the walls of an upright cylindrical bottomed vessel and a small cylinder at the center of the vessel with a conical upper part. All surfaces in said space which are subjected to wear have exchangeable wearing liners. Provided in the bottom of the vessel is one or more sliding shutters which are mounted on slideways or roller paths and are operated by operating cylinders or other operating means. Arranged around the top edge of the vessel is a horizontal ring or collar which forms a support for a number of rolls which are mounted on journals and preferably provided with rubber or like treads. Rotatable in relation to and fixed in all directions by these rollers is a bearing and drive rim assembly which is so arranged as to form together with the rollers a bearing around the upper portion of the cylindrical vessel. The bearing and drive rim assembly can be so constructed as to permit it to be driven with the aid of gears, friction wheels, chains, drive belts or the like or electromagnetically or by any other device from one or more power sources positioned around and preferably attached to the outer wall or collar of the vessel. This arrangement will result in a very flexible drive, and power sources can be cut in or cut out according to the amount of power required. When operation is realized with the aid of several power sources a faulty power source can be rapidly disconnected and operation thus continued even if on a smaller scale. This flexibility also makes possible any desired change of the rotary speed of the driving assembly by exchange of gears, pulleys, sprockets or any other device since no consideration need be paid to fixed shaft distances like in devices driven via conventional gear cases. Secured to the bearing and drive rim assembly is an entrainer ring and a number of brackets are arranged on the vertical wall of said ring, which faces the center of the mixer. Rotatably suspended in bearings in each bracket is a shaft, one end of which is a fastening for a blade holder to which the mixing blade is screwed, while the other end of said shaft is a fastening for a lever. The mixing blades move in the space between the outer wall of the cylindrical vessel and the cylindrical central portion thereof when the entrainer ring is caused to rotate. By the provision of a given number of brackets of different lengths the mixing blades will cover the entire space between the outer and inner walls. The brackets of the greatest length forming the longest moment arms carry the mixing blades having the lowest peripheral speed and the smallest load, whereby brackets and fastenings can be made light-weight and flexible.

The lever arms which serve to transmit forces from the mixing blades through shafts and blade holders are pivoted to hydraulic or pneumatic operating cylinders which are pivotally and adjustably attached to the entrainer ring. The two extreme positions of the lever arms and thus of the mixing blades are determined by the stroke lengths of the cylinders. To permit adjustment of the positions of the mixing blades in relation to the bottom of the vessel the cylinders can be shifted with respect to the entrainer ring. Via a rotary pipe coupling the cylinders are connected with the aid of pipes and hoses to a valve and adjustable pressure control means. Besides the cylinders are directly connected to a container which at hydraulic operation is provided with a floating bottom valve and filled with gas of predetermined pressure. The already mentioned valve adjustably connects the system with either a pressure inlet or a pressure outlet. To keep the mixing blades down in the material being mixed there is required a certain pressure in the cylinders operating said blades. This is realized by a pressure medium being pressed into the system via the valve until the pressure is obtained at which the pressure control means has been set. According to need, the pressure can be altered and this can also be done as mixing is in progress if it should prove for example that the pressure is too low so that the mixing blades work only in the upper layer of the material being mixed. The gas in the container functions in the manner of a spring if any mixing blade should be subjected to a greater load than that corresponding to the prevailing pressure in the container. At hydraulic operation the bottom valve will float on the surface of the liquid supplied which is again pressed back when the load decreases or ceases. To prevent separation of the finished mixture at emptying a valve is so arranged that, when the shutter starts to open, the passage between the cylinders operating the mixing blades and the discharge will be opened and as a result the pressure is reduced or disappears and the mixing blades are swung upwards either owing to the resistance exerted by the material being mixed or by springs. At hydraulic operation the floating valve in the vessel sinks with the liquid that may have been pressed in, and closes when it has reached the bottom, thereby preventing gas from escaping. At a predetermined point of time or at a certain opening position of the sliding shutter the valve is adjusted so that pressure medium is pressed back into the container and the operating cylinders. The flow through the valve can be adjusted in such a way that when the mixing blades are swung downwards they always operate in the uppermost layer of the sinking material. This will prevent separation without the mixing time being extended since the rapidly rotating mixing blades do not throw the material out of the sliding shutter as they would have done if they had constantly moved at or adjacent the bottom plane. On the contrary, they will move the material up to the opening so that it will fall out by gravity.

To permit addition of water and keeping the upper part of the wall which is not flushed with water, free from agglomerating binder, for example in the manufacture of concrete, the collar on the outer wall of the vessel is provided with a pipe (in this instance a rectangular pipe) which extends around the vessel constituting a closed ring which has one or more supply pipes and is divisible in a number of parts for easy mounting and dismounting. The wall of the pipe which faces the center of the mixer is perforated and higher than the opposite wall. The pipe is so arranged that said wall forms an extension of the outer wall of the vessel. The extension is provided with a rubber covering which is fixed at the top edge and reaches so far downwards as to cover the perforations. When the water is supplied to the pipe it is forced out through the perforations and directed downwards along the vessel side, whereby the vessel side will be flushed clean and the movements of the covering will remove agglomerating cement dust or the like.

To prevent coarse aggregate when filled into the vessel from damaging brackets and blade holders or other movable parts the mixer is provided with one or more filling hoppers so arranged that the conical central portion will guide the material down into the mixer to the place of the lowest peripheral speed of brackets and blade holders.

The accompanying drawing shows a vertical section of an embodiment of the apparatus in which the various details are designated as follows.

1 is a cylindrical vessel provided with a cylindrical inner wall with a conical top portion 2 and wearing liner 3. Disposed at the bottom of the vessel is one or more discharge shutters 4 mounted on slideways or roller paths and in the present instance equipped with an operating cylinder 5 which is connected to a valve 23 by pipes or hoses. A collar 6 is arranged around the top portion of the vessel 1 and a number of rollers 7 is mounted on said collar for the bearing and drive rim assembly 8 to rotate against. The rollers 7 are preferably mounted on journals and provided with treads of rubber or the like. The drive rim assembly 8 is driven by means of gears 9, belts, chains or electromagnetically from one or more power sources 10 and is secured to the entrainer ring 11. Arranged on the vertical portion of the entrainer ring 11 is a number of bearing brackets 12 which carry shafts 14 provided at one end with levers 13 and at the other end with blade holders 15 to which the mixing blades 16 are screwed. The levers 13 are pivotally secured by pins 17 to the piston rod ends of operating cylinders 18 whose ends are pivotally and, in the stroke direction, adjustably fixed to the entrainer ring 11. The operating cylinders are connected over the rotary pipe coupling 19 by pipes or hoses to a gas container 20 possibly equipped with a floating bottom valve 21, adjustable control means 22 and a valve 23. A pressure inlet 24 is connected to a pump, accumulator or like means, and an outlet 25 at hydraulic operation to a liquid container. The collar 6 has means for adding water, said means comprising a supply pipe 26, a manifold 27, and an extension piece 28 which is perforated at its lower portion where it forms a wall on the manifold 27, and equipped with a covering 29 of rubber or other elastic material. A filling hopper 31 is secured to the collar 6 by fastenings 30.

What I claim and desire to secure by Letters Patent is:

1. An apparatus for mixing materials, preferably the ingredients of concrete, including an annular vessel having a bottom discharge, an annular member mounted at the periphery of said vessel and rotatable on it, and a number of mixing blades (16) which are mounted on arms (15) and caused to shift in a circular sense by power transmission from said annular member, wherein the annular member (8, 11) has associated with it means such as brackets (12) which project inwardly towards the center of the vessel (1) and have the inner ends spaced from the cylindrical or conical inner boundary wall (2) of the annular vessel (1), the brackets (12) support rotary shafts (14) which at their ends close to the vessel center are rigidly connected with the arms (15) carrying the mixing blades (16) and localized preferably at right angles to the rotary shafts (14) which have the outer ends connected to operating means (13, 18) associated with the rotatable member to pivot the mixing blade arms (15).

2. An apparatus as claimed in claim 1, wherein the rotatable member (11) annularly enclosing the vessel is provided with an annular drive rim assembly (8) with which one or more motor-driven drive wheels (9) are adapted to engage to effect rotation of said member and shifting of the mixing blades (16) driven by said members.

3. An apparatus as claimed in claim 2, wherein the operating means are cylinder and piston units (18) which are adapted, via operating arms (13) associated with the outer ends of the rotary shafts, to provide rotation of said shafts from a position in which the mixing blades carried by said shafts occupy mixing position adjacent the bottom of the mixer vessel to a position in which said blades occupy an operative position remote from the bottom of said vessel.

4. An apparatus as claimed in claim 1, wherein the operating means are cylinder and piston units (18) which are adapted, via operating arms (13) associated with the outer ends of the rotary shafts, to provide rotation of said shafts from a position in which the mixing blades carried by said shafts occupy mixing position adjacent the bottom of the mixer vessel to a position in which said blades occupy an operative position remote from the bottom of said vessel.

5. An apparatus as claimed in claim 4, wherein the cylinder and piston units (18) operating the mixing blades (16) are connected via lines extending towards the center of the mixer vessel with a rotary coupling (19) which in turn is connected via a line (24) to a source of hydraulic pressure medium of adjustable pressure and to an expansion chamber which is partly filled with gas of adjustable pressure, said gas when one or more of the mixing blades are under excessive load being compressed by the counter-pressure thereby generated in the hydraulic system.

6. An apparatus as claimed in claim 5, wherein a valve mechanism is interposed between the source of pressure and the cylinder and piston units, and upon emptying of the vessel the valve mechanism is adapted firstly by pressure reduction to swing the mixing blades from their position at the bottom of the vessel to the level of the surface layer of the mixed material and subsequently by successive increase of the pressure to swing them downwards as the surface layer of the material sinks.

References Cited

UNITED STATES PATENTS

| | | | |
|---|---|---|---|
| 1,991,833 | 2/1935 | Adams | 259—179 |
| 3,069,145 | 12/1962 | Fejmert | 259—178 |
| 3,168,296 | 2/1965 | Cowley | 259—178 |
| 3,456,926 | 7/1969 | Hummelshoj | 259—178 |

ROBERT W. JENKINS, Primary Examiner